(No Model.)
F. H. NUTTER.
BURGLAR ALARM AND TESTING SYSTEM.
No. 401,789. Patented Apr. 23, 1889.
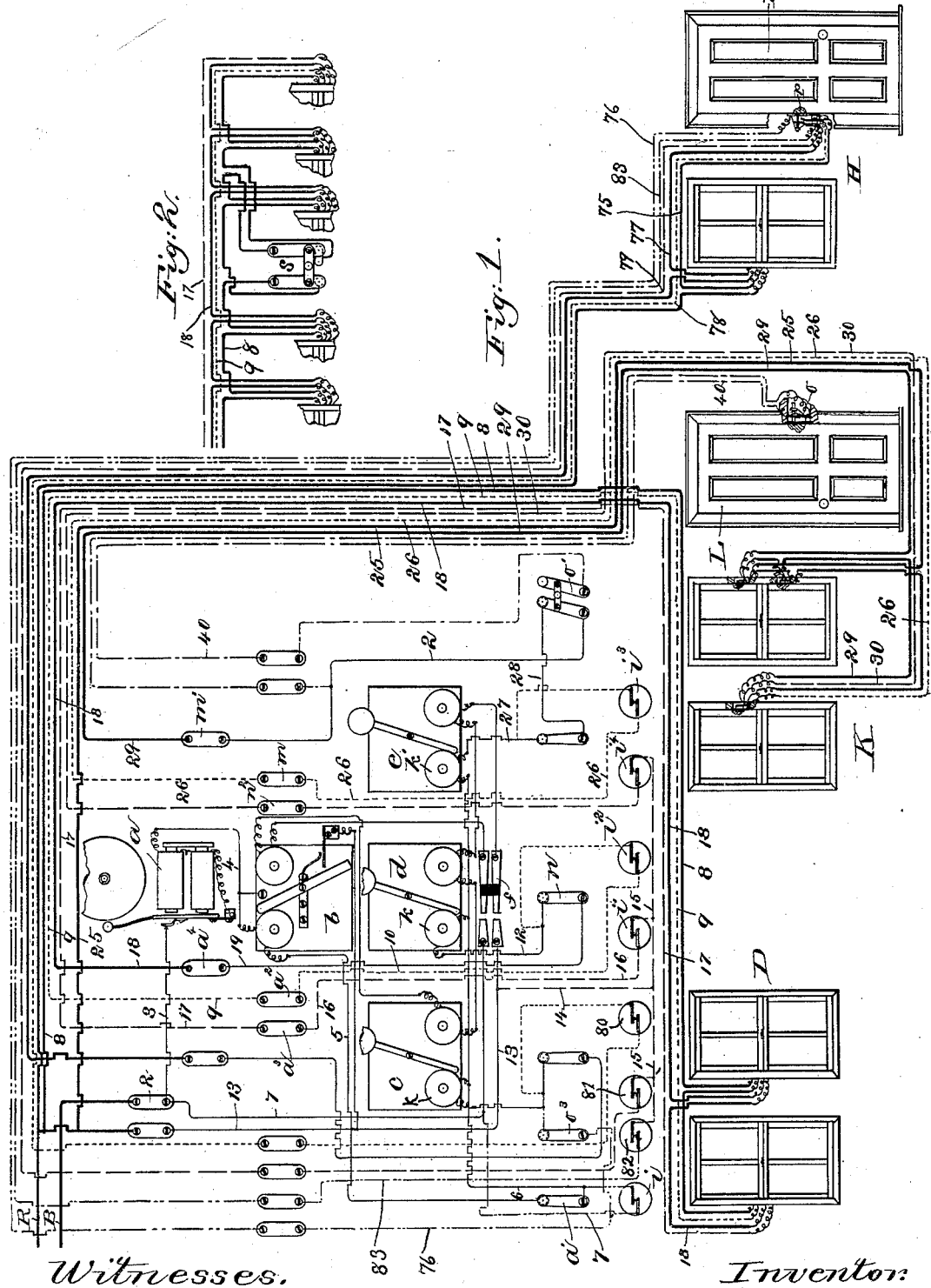

UNITED STATES PATENT OFFICE.

FRANK H. NUTTER, OF MALDEN, ASSIGNOR TO HERBERT L. SLADE, OF CHELSEA, MASSACHUSETTS.

BURGLAR-ALARM AND TESTING SYSTEM.

SPECIFICATION forming part of Letters Patent No. 401,789, dated April 23, 1889.

Application filed July 9, 1888. Serial No. 279,431. (No model.)

*To all whom it may concern:*

Be it known that I, FRANK H. NUTTER, of Malden, county of Middlesex, State of Massachusetts, have invented an Improvement in Burglar-Alarm and Testing System, of which the following description, in connection with the accompanying drawings, is a specification, like letters on the drawings representing like parts.

This invention has for its object to construct and arrange an efficient burglar-alarm system and provide the same with testing apparatus whereby every wire of the system may be tested, either silently or audibly.

In carrying out this invention the usual annunciator drops and bell are employed, the operating-coils of the said drops and bell being included in or connected with one of several independent loops or branches leading from one of the main battery-wires, there being two such parallel loops or branches extending to each compartment. One member of each circuit-closing device in a compartment is included in each parallel loop arranged in said compartment, so that when the said circuit-closing device is closed a continuous circuit is presented from one of the main battery-wires over one portion of each loop through a particular annunciator-coil and returning to the other main battery-wire. The return-wire of each pair of loops or branches arranged in a compartment are employed as the testing-wires, being provided with press-buttons at a central point, whereby each loop or branch may be tested independently. A suitable switch is provided for controlling the introduction of the bell as desired, so that the circuits may be tested when the bell is cut out or silently, the annunciator-drop alone indicating the condition of the circuit. Other switches are also employed for controlling the different circuits leading to the different compartments, so that one or another compartment may be cut out at will, as will be hereinafter more fully described, and also for controlling a portion only of a compartment or section.

Figure 1 shows in diagram a burglar-alarm and testing system embodying this invention, and Fig. 2 a modification to be referred to.

The annunciator, of any suitable construction, is located at a central point, it comprising a bell, $a$, general annunciator-drop $b$, several independent annunciator-drops, as $c\ d\ e$, the return-switch or check-button $f$, and testing-buttons, &c.

In Figure 1 the annunciator is shown as having three independent drops, $c\ d\ e$, and is therefore arranged for three independent compartments, D K H. The main battery-wire B leads to the plate 2, thence by wire 3 to bell $a$, thence by wire 4 to the operating or repelling coil of the general annunciator-drop $b$, thence by wires 5 6 to one side of the operating or repelling coils of the independent annunciator-drops $c\ d\ e$. A switch, $a'$, is included in the wire 5, which will be employed as the bell-switch to cut in and out the bell $a$. When the switch $a'$ is open and the bell cut out, the press-button $i$, which is included in the wire 7, may be closed, so that the line will be closed to the wire 6.

A wire, 8, leads from the battery-wire R, extending to one of the compartments, as D, and joining one member of each circuit changing or closing device in said compartment, such devices being herein understood as being of any well-known construction. A wire, 9, forms a continuation of or return-wire of the loop 8 9, said wire 9 leading to the plate $a^2$, thence by wires 10 and 12 to the coil $k$ of the drop $d$, and thence to the wire 6, and returning to the other battery-wire, B. A wire, 13, leads from the main battery-wire R to one member of the usual return-switch, F, and a wire, 14, leads from said wire 13 to the wire 15. A wire, 16, leads from the wire 15 to the plate $a^3$, and the wire 17 leads from the plate $a^3$ to the companion member of the circuit-closing device at D, said wire 17 continuing or returning by wire 18 to the plate $a^4$, and a wire, 19, connects the plate with the wire 12. It will thus be seen that a pair of loops extend from and return to the battery-wires to this compartment C, and when the circuit-closing device is closed—as, for instance, by the opening of a window—the circuit will pass from the battery-wire R over wires 8 18 19 12, coil $k$, wires 6 5, coil-wire 4, bell $a$, wire 3 to wire B, thereby moving the annunciator $d$, general annunciator $b$, and operating the bell $a$, the wires 9 and 17 being normally open, as will be described.

A press-button, $i'$, is included in the wire 16. A press-button, $i^2$, is included in the wire 10 for testing, and a switch, $n$, is included in the wires 12 19 for opening the compartment-loop. The press-button is employed for testing the loop 17 18, and is operated as follows: For a silent test, the switch $a'$ is opened, cutting out the bell; the press-buttons $i$ and $i'$ are closed, and the current passes over the wires 13 14 15 16 17 18 19 12, coil $k$, wires 6 and 7 to wire B, thereby moving the drop $d$.

The press-button $i^2$ is employed to test the loop 8 9, and is operated as follows for a silent test: The switch $a'$ is opened, press-buttons $i$ and $i^2$ closed, and the current then passes over the wires 8 9 10 12, coil $k$, wires 6 and 7 to wire B, thereby operating the drop $d$. Another wire, 25, leads from the battery-wire R, and a wire, 26, leads to the plate $m$, continuing to the wire 27 through the coil $k'$ to wire 6, thence returning to the battery-wire B, as before described. The wire 26 contains the press-button $i^3$ for testing the loop 25 26. A wire, 28, leads from the wire 27 to the plate $m'$, continuing by wire 29 and returning by wire 30 to plate $n^2$ and on to wire 15, said wire including the press-button $i^4$ for testing the loop. These loops 25 26 and 29 30 are connected with companion members of the circuit-closing device at a window, for instance, as before described. These parallel loops may include as many circuit-closing devices as desired.

I have also herein shown another pair of loops or branches leading from and returning to the battery-wires, said loops or branches including the compartment H, said loops or branches being composed of the wire 75 77 and return-wires 78 79, the operation being as before described, testing-buttons 80 81 being employed at the annunciator for testing, as before described.

In compartment K, I have shown a door, as L, through which a person passes to enter the said compartment, and a circuit-changing device, as $o$, of any well-known form, is employed, which is moved by the opening of the door to open the loop or branch wire 40, so that while the said door is open the windows of the compartment K may be opened and closed at will. A switch, $o'$, is located at the annunciator, by which the loop or branch 40 may be cut out or in as desired.

In compartment H, I have shown an outside door, as P, provided with a circuit-changing device, $p$, of well-known form, and at the annunciator I have shown a switch, $o^3$, as included in the loop or branch wire 76, which includes said circuit-changing device $p$, so that the said loop or branch wire 76 may be opened without affecting the other circuits leading to the compartment. When the circuit is closed at $p$, as by the opening of the door P, the current passes over the wire 75 leading from battery-wire R, circuit-changing device, thence over wire 76, switch $o^3$, coil $k$ of annunciator $c$, wire 6, switch $a'$, wire 5, general annunciator $b$, bell-wire 3 to battery-wire B. A press-button, 82, is included in a wire, 83, leading to the compartment H, and when closed a circuit is formed over wire 83, circuit-changing device, wire 76, switch $o^3$, coil $k$ of the annunciator $c$, wire 6, press-button $i$, wire 7 to battery. The check-button or return-switch $f$ is for returning the annunciators to their normal position, and is connected in circuit and operated in well-known manner.

In Fig. 2 I have shown a pair of loops or branches, as before described—as, for instance, like 17, 18, and 8 9—and also a two-step switch, $s$, is connected in a wire, 8, in usual manner, so that when moved toward the right one window may be cut out; but it is obvious that the wires may be arranged to cut out more than one window, if desired.

I claim—

1. In a burglar-alarm system, the battery-wires and several pairs of independent loops leading therefrom, each pair of loops being normally open respectively at opposite sides of the battery, and provided with a testing press-button, combined with one member of a circuit-changing device included in each loop, whereby each independent pair of loops offers a closed path for the current when the members of the circuit-changing devices are brought in contact, and the indicating-signal included in one of the loops of each pair between its testing press-button and the battery, substantially as described.

2. In a burglar-alarm system, the battery-wires and several pairs of independent loops leading therefrom, each pair of loops being normally open respectively at opposite sides of the battery, and provided with a testing press-button and circuit-closing devices, one of the members of which is connected in each loop, combined with the independent loop or wire 76 83 and the circuit-changing device included therein, and the switch, as 82, included in said independent loop or wire, substantially as and for the purpose set forth.

3. In a burglar-alarm system, the battery-wires and several pairs of independent loops leading therefrom, each pair of loops being normally open respectively at opposite sides of the battery, and provided with a testing press-button, combined with one member of a circuit-closing device for each loop, substantially as described.

In testimony whereof I have signed my name to this specification in the presence of two subscribing witnesses.

FRANK H. NUTTER.

Witnesses:
BERNICE J. NOYES,
F. L. EMERY.